United States Patent
Moro et al.

(10) Patent No.: US 9,886,516 B2
(45) Date of Patent: Feb. 6, 2018

(54) APPROACH FOR PROCESSING IMAGE DATA AT NETWORK SITES

(71) Applicants: Tatsuya Moro, Cupertino, CA (US); Kenichiro Kuwahara, Mexico City (MX); Barbara Galvez Gonzalez, Mexico City (MX)

(72) Inventors: Tatsuya Moro, Cupertino, CA (US); Kenichiro Kuwahara, Mexico City (MX); Barbara Galvez Gonzalez, Mexico City (MX)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/065,556

(22) Filed: Mar. 9, 2016

(65) Prior Publication Data

US 2017/0262548 A1  Sep. 14, 2017

(51) Int. Cl.

| G06K 9/46 | (2006.01) |
|---|---|
| G06F 17/30 | (2006.01) |
| G06K 19/06 | (2006.01) |
| G07G 5/00 | (2006.01) |
| G06Q 40/00 | (2012.01) |
| G06K 9/00 | (2006.01) |
| G06F 3/0481 | (2013.01) |
| G06F 17/22 | (2006.01) |

(52) U.S. Cl.
CPC ...... G06F 17/30876 (2013.01); G06F 3/0481 (2013.01); G06F 17/2247 (2013.01); G06F 17/30598 (2013.01); G06F 17/30864 (2013.01); G06K 9/00442 (2013.01); G06K 19/06037 (2013.01); G06Q 40/00 (2013.01); G07G 5/00 (2013.01)

(58) Field of Classification Search
CPC ...... H04L 67/16; H04W 12/08; G06F 19/322; G06F 19/3406
See application file for complete search history.

(56) References Cited

U.S. PATENT DOCUMENTS

2017/0109391 A1* 4/2017 Rosen ............... G06F 17/30345

* cited by examiner

*Primary Examiner* — Iman K Kholdebarin
*Assistant Examiner* — Mai Tran
(74) *Attorney, Agent, or Firm* — Hickman Palermo Becker Bingham LLP; Edward A. Becker (57) ABSTRACT

According to an approach for processing image data at network sites, a user invokes functionality on a client device, a scanning device, or a multi-function peripheral (MFP) to cause one or more printed receipts to be scanned to generate image or scan data. The scan data is transmitted by the client device or the MFP to a receipt data management system that maintains access data for a plurality of users and sites. The sites each include a graphical user interface that allows users to manually renter receipt data and request the generation of receipt data processing results. The receipt data management system manages the processing of the receipt data by a specified site on behalf of the user to generate receipt data processing results that satisfy third party requirements. This includes satisfying any authentication requirements of the specified site.

20 Claims, 6 Drawing Sheets

Category Data 138

| Store | Category |
|---|---|
| Starbucks | Food |
| Hilton | Hotel |
| Amtrak | Transportation |

User Data 137

| User | Site 140 | Site 150 | Site 160 | Company | Tax ID | Email |
|---|---|---|---|---|---|---|
| A | abc123 | x6yz4 | 2y5lfy | BBVA | a3256F | A@BBVA.com |
| B | d94f7 | d84jf4 | r84f2l | BBVA | a3256F | B@BBVA.com |
| C | djv46d | d93jr | 94jtfdr | RMX | X579A | C@RMX.com |

Receipt Data 139

| Company | User | Store | Date | Amount | Category | Ticket |
|---|---|---|---|---|---|---|
| BBVA | A | Starbucks | 1/2/16 | $4.50 | Food | 021583 |
| BBVA | B | Hilton | 1/3/16 | $259.40 | Hotel | 74329 |
| RMX | C | Amtrak | 1/4/16 | $32.57 | Transportation | 7450 |

```
<?xml version="1.0" encoding="utf-8"?><cfdi:Comprobante LugarExpedicion="Mexico"
Moneda="MXN" TipoCambio="1" certificado="...=" condicionesDePago="Contado"
fecha="2015-08-19T07:43:23" folio="337797" formaDePago="PAGO EN UNA SOLA
EXHIBICION" metodoDePago="..." serie="FNPE" subTotal="94.82"
tipoDeComprobante="ingreso" total="110.00" version="3.2"
xmlns:cfdi="http://www.sat.gob.mx/cfd/3" xmlns:xsi="http://www.w3.org/2001/XMLSchema-
instance" xsi:schemaLocation="http://www.sat.gob.mx/cfd/3
http://www.sat.gob.mx/sitio_internet/cfd/3/cfdv32.xsd">

<cfdi:Emisor nombre="FONDO NACIONAL DE INFRAESTRUCTURA"
rfc="FNI970829JR9">

<cfdi:DomicilioFiscal calle="JAVIER BARROS SIERRA" codigoPostal="01219"
colonia="LOMAS DE SANTA FE" estado="DISTRITO FEDERAL" municipio="ALVARO
OBREGON" noExterior="515" pais="MEXICO"/>

<cfdi:ExpedidoEn calle="CALZADA DE LOS REYES" codigoPostal="62130"
colonia="TETELA DEL MONTE" estado="MORELOS" municipio="CUERNAVACA"
noExterior="24" pais="MEXICO"/>

<cfdi:RegimenFiscal Regimen="de las Personas Morales con fines no lucrativos"/>

</cfdi:Emisor>

<cfdi:Receptor nombre="RICOH MEXICANA SA DE CV" rfc="RME970123TGA">

<cfdi:Domicilio calle="CDA DE PALOMAS" codigoPostal="11650" colonia="REFORMA
SOCIAL" estado="DISTRITO FEDERAL" municipio="MIGUEL HIDALGO" noExterior="22"
noInterior="301" pais="MEXICO"/>

</cfdi:Receptor>

<cfdi:Conceptos>

<cfdi:Concepto cantidad="1" descripcion="CERRO GORDO 10-AGOSTO-2015 09:37:19
AM" importe="30.17" unidad="PEAJE" valorUnitario="30.17"/>

<cfdi:Concepto cantidad="1" descripcion="CERRO GORDO 10-AGOSTO-2015 16:32:51
PM" importe="30.17" unidad="PEAJE" valorUnitario="30.17"/>

<cfdi:Concepto cantidad="1" descripcion="CHICHIMEQUILLAS 14-AGOSTO-2015
18:41:05 PM" importe="34.48" unidad="PEAJE" valorUnitario="34.48"/>

</cfdi:Conceptos>

<cfdi:Impuestos totalImpuestosTrasladados="15.18">

<cfdi:Traslados>

<cfdi:Traslado importe="15.18" impuesto="IVA" tasa="16"/>
```

FIG. 4

APPROACH FOR PROCESSING IMAGE DATA AT NETWORK SITES

FIELD OF THE INVENTION

Embodiments relate generally to processing image data and more specifically, to processing image data at network sites. SUGGESTED GROUP ART UNIT: 2625; SUGGESTED CLASSIFICATION: 358.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The use of electronic receipts with the purchase of goods and services continues to be more widely adopted. For example, many vendors now offer an option for customers to receive electronic receipts via email instead of paper receipts at the point of purchase. Electronic receipts have several benefits over paper receipts. For example, electronic receipts do not require any consumables, e.g., paper, ink, etc., and they can be quickly and easily copied and stored in multiple locations. In addition, electronic receipts are now being required by some third parties, such as government entities, etc. For example, Mexico has implemented an electronic invoicing requirement known as Comprobante Fiscal Digital por Internet (CFDI) that requires vendors and customers to maintain receipts in electronic form to satisfy recordkeeping requirements. Furthermore, some third party requirements require that data be maintained in different formats, such as portable document format (PDF) and extensible markup language (XML). CFDI requires that data be maintained in XML and PDF is optional. Some vendors provide Web applications with a graphical user interface that allows customers to manually enter receipt data and generate electronic receipts in a form that satisfies third party requirements for receipt data. Despite their availability, there are some drawbacks to these Web applications. They all require that customers manually enter data, which can be cumbersome, prone to error and time consuming. These issues are exacerbated by the fact that there is no standard specification for the layout and operation of the graphical user interfaces provided by vendors, so they all tend to be different. In addition, many of these Web applications include an authentication requirement, such as user authentication, that must be satisfied before a user is granted access to enter receipt data. All of these factors can lead to an unsatisfactory user experience.

SUMMARY

An apparatus includes one or more processors and one or more memories storing instructions that are processed by the one or more processors. Processing of the instructions by the one or more processors causes the apparatus to receive, from a client device, a first receipt data processing request to process receipt data, wherein the first receipt data processing request includes user identification data that identifies a user associated with the first receipt data processing request to process receipt data and receipt data, wherein the receipt data includes data that at least identifies one or more printed receipts. Processing of the instructions by the one or more processors causes the apparatus to determine, based upon the receipt data, a business entity that issued the one or more printed receipts and determine a site that corresponds to the business entity that issued the one or more printed receipts, wherein the site is one site of a plurality of sites for processing receipt data and each site of the plurality of sites includes both access requirements and a user interface that allows users to enter receipt data and request generation of receipt data processing results that include at least an electronic receipt. Processing of the instructions by the one or more processors causes the apparatus to determine from a plurality of site access data, based upon the user identification data that identifies a user associated with the first receipt data processing request to process receipt data and the site identification data that specifies a site where the receipt data is to be processed, particular site access data for the user that will satisfy the access requirement for the site and generate and transmit, to the site specified by the site identification data, a second receipt data processing request that satisfies the access requirement for the site, wherein the second data processing request includes at least the receipt data that at least identifies one or more printed receipts, the particular site access data and destination data that identifies a destination where receipt data processing results are to be transmitted, wherein the receipt data processing results include at least electronic receipt data that corresponds to the one or more printed receipts.

BRIEF DESCRIPTION OF THE DRAWINGS

In the figures of the accompanying drawings like reference numerals refer to similar elements.

FIG. 3B depicts an electronic receipt in the form of an XML document.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. System Architecture
III. Processing Receipt Data
IV. Additional Processing of Electronic Receipt Data
V. Implementation Examples

I. Overview

An approach is provided for processing receipts at network sites. The approach allows a user to have a printed receipt automatically scanned and processed by a site to obtain receipt data processing results that comply with third party requirements. As used herein, the term "third party" refers to a party other than the user and the network sites. According to the approach, the user invokes functionality on a client device, scanning device, or a multi-function peripheral (MFP) to cause one or more printed receipts to be scanned to generate scan data. The scan data is transmitted by the client device or the MFP to a receipt data management system that maintains access data for a plurality of users and sites. The sites each include a user interface that allows users to enter receipt data and request the generation of receipt data processing results. The receipt data management system manages the processing of the receipt data by a specified site on behalf of the user to generate receipt data processing results that satisfy third party requirements. This includes satisfying any authentication requirements of the specified site. The approach provides a favorable user experience by allowing a user to have receipts scanned and processed at sites in response to a single selection by the user of an application on a client device, or a function on an MFP, without the user having to manually enter receipt data via the graphical user interfaces of the sites. Furthermore, the approach relieves the client device or MFP of having to be aware of and implement any authentication and API of the specified site. Embodiments also include providing receipt data processing results to other applications for processing.

II. System Architecture

Figure 1A:
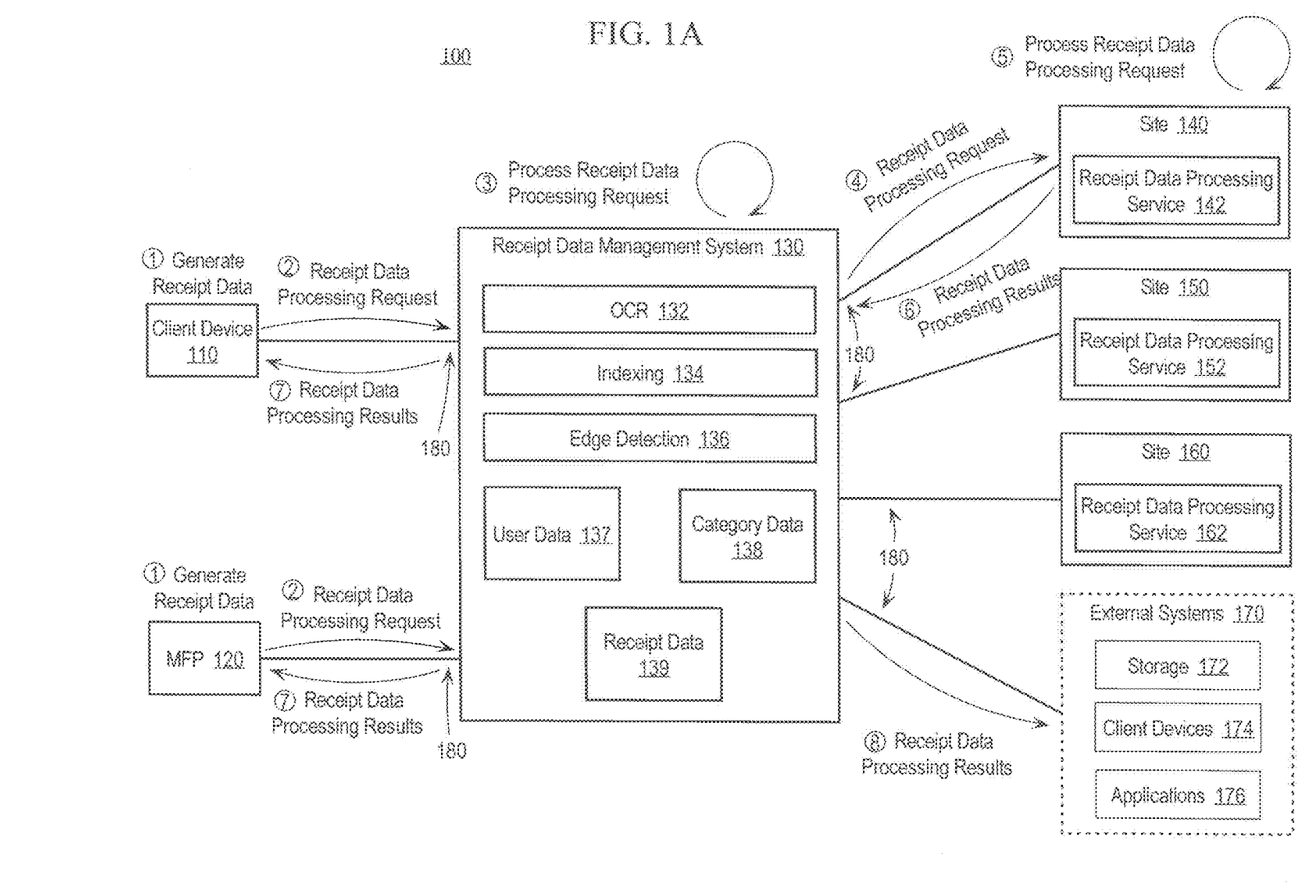
FIG. 1A is a block diagram that depicts an arrangement for processing electronic receipt data.

FIG. 1A is a block diagram that depicts an arrangement 100 for processing electronic receipt data, which is also referred to herein as "receipt data." Arrangement 100 includes a client device 110, a multifunction peripheral (MFP) 120, a receipt data management system 130, sites 140, 150, 160 and external systems 170, communicatively coupled via one or more communications links 180. Communications links 180 may be implemented by any number and type of direct and indirect communications links. For example, communications links 180 may be implemented by any number and type of wired or wireless networks, such as local area networks (LANs), wide area networks (WANs), the Internet, etc. The various elements depicted in FIG. 1A may also communicated with each other via direct communications links. Arrangement 100 may include fewer elements or more elements than depicted in FIG. 1A, depending upon a particular implementation.

Client device 110 may be implemented by any type of client device and embodiments are not limited to particular types of client devices. Examples of client device 110 include, without limitation, a mobile communications device such as a smart phone, a tablet computing device, a personal digital assistant, a laptop computer, a desktop computer, a workstation, etc. MFP 120 is a multi-function peripheral that is configured to perform one or more functions, such as scanning, copying, printing, faxing, etc. MFP 120 may including other functionality, such as optical character recognition (OCR), etc., although this is not required. Embodiments are described herein in the context of client device 110 and MFP 120 for purposes of explanation, but are applicable to other types of client-side devices, such as scanning devices.

Receipt data management system 130 is a system configured generally to manage receipt data and more specifically, to manage the processing of receipt data by sites 140, 150, 160 on behalf of users of client device 110 and MFP 120. This may include fulfilling any access requirements, such as user authentication, required by sites 140, 150, 160. According to one embodiment, receipt data management system 130 is configured to generate and transmit to sites 140, 150, 160, one or more data processing requests using an API supported by sites 140, 150, 160. Example functionality that may be performed by receipt data management system 130 include, without limitation, OCR 132, indexing 134 to index results of the OCR, and edge detection 136 to identify particular receipts represented in receipt data. This functionality is also described in more detail hereinafter. Receipt data management system 130 maintains data used for processing receipt data processing requests, including user data 137, category data 138 and receipt data 139, which are described in more detail hereinafter. Receipt data management system 130 may provide an application program interface (API) that allows devices and processes to interact with receipt data management system 130. For example, an API of receipt data management system 130 may allow client device 110 and MFP 120 to submit receipt data processing requests to receipt data management system 130, as described in more detail hereinafter. Receipt data management system 130 may be implemented by one or more processes executing on one or more computing devices. The one or more computing devices upon which receipt data management system 130 executes may include one or more communications interfaces to allow communications between receipt data management system 130 and other devices via one or more networks. Although receipt data management system 130 is depicted in FIG. 1A as a separate entity, this is done for explanation purposes only, and receipt data management system 130 may be implemented on client device 110, MFP 120, sites 140, 150, 160, external systems 170, or any combination thereof, and embodiments are not limited to any particular implementation.

Sites 140, 150, 160 are locations that are associated with business organizations that both sell goods and/or services to customers and issue printed receipts for the sale of those goods and/or services to customers. For example, a coffee shop or café may offer beverage and food items for sale to customers and issue printed receipts to customers. The coffee shop or café has a corresponding site, such as sites 140, 150, 160, which include the capability to process receipt data and generate receipt data processing results that comply with third party requirements for electronic receipts. Although embodiments are described herein in the context of sites 140, 150, 160 each being associated with a corresponding business entity for purposes of explanation, a one-to-one relationship is not required and embodiments are applicable to sites 140, 150, 160 corresponding to more than one business entity, for example, in a shared or third party arrangement. The capability to process receipt data and generate receipt data processing results that comply with third party requirements for electronic receipts may be implemented in a wide variety of ways that may vary depending upon a particular implementation. According to one embodiment, sites 140, 150, 160 each include a receipt data processing service 142, 152, 162, respectively, that includes the capability to process receipt data and generate receipt data processing results that comply with third party requirements. In addition, receipt data processing services 142, 152, 162 each provide a different graphical user interface that is tailored to allow customers, i.e., users, to manually enter receipt data from the printed receipts issued by the respective site 140, 150, 160. The graphical user interfaces also allow customers to request processing of the receipt data to obtain receipt data processing results that include at least an electronic receipt. As described in more detail hereinafter, receipt data processing results may include receipt data in different formats, such as PDF and XML, formats to satisfy the third party requirements. In addition, site 140, 150, 160 may process receipt data differently, while still satisfying the third party requirements. For example, one site may provide additional data, less data, and data in different formats, in the receipt data processing results relative to another site, while still including the minimum data required by the third party requirements. According to one embodiment, each site 140, 150, 160 implements an access requirement, such as user authentication, that may vary from site to site. Embodiments are applicable to any type of access requirement that may vary depending upon a particular implementation. For example, sites 140, 150, 160 may require a user ID and password be successfully authenticated before a user is granted access to enter receipt data and request electronic receipt(s) that satisfy third party requirements.

Sites 140, 150, 160 may each be implemented by computer hardware, computer software, or any combination of computer hardware and computer software and may include a wide variety of processes, such as Web servers and Web applications. According to one embodiment, sites 140, 150, 160 each include an application program interfaces (API) that allows receipt data management system 130 to access functionality on sites 140, 150, 160 and the APIs may vary from site to site. Receipt data processing services 142, 152, 162 may be implemented by any type of process, such as one or more application programs and/or Web applications. According to one embodiment, sites 140, 150, 160 are implemented as Web sites hosted by a Web server.

External systems 170 may include a computing device, process, or any combination of computing devices and processes that receive and store and/or process report data generated by receipt data management system 130. Examples external systems 170 include, without limitation, storage 172, client devices 174 and applications 176.

III. Processing Receipt Data

Figure 2:
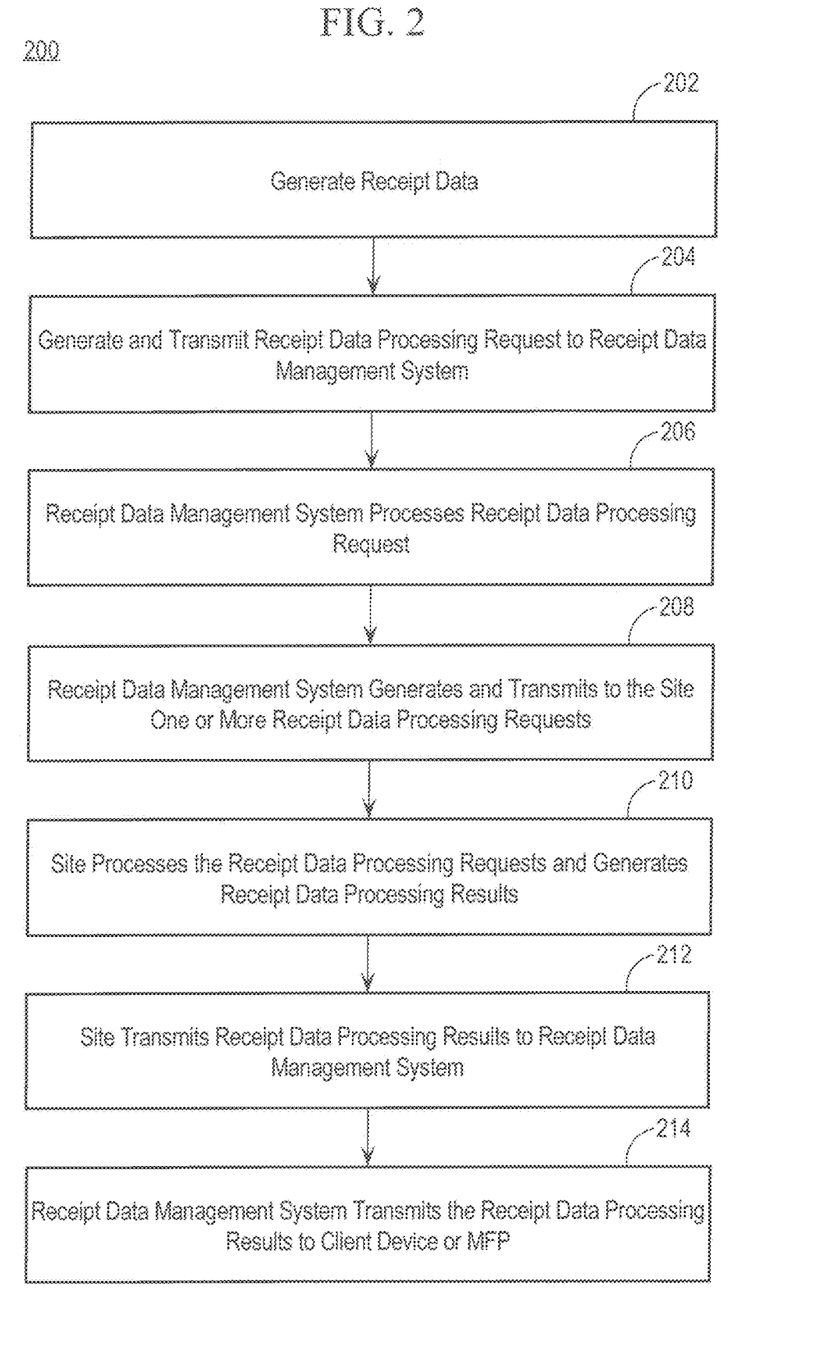
FIG. 2 is a flow diagram that depicts an approach for processing receipt data.

FIG. 2 is a flow diagram 200 that depicts an approach for processing receipt data according to one embodiment. For purposes of explanation, it is presumed that the approach starts with a user having previously purchased goods and/or services from a business entity and issued to the user one or more printed receipts for the purchased goods and/or services. It is further presumed that there is a need for the user to obtain an electronic receipt from the business entity for the goods and/or services that the user purchased from the business entity. For example, the user may need to obtain electronic receipt data in XML format that complies with CFDI requirements and the user may also want to obtain the electronic receipt data in one or more other formats, such as PDF. It is also presumed that site 140 corresponds to the business entity and is configured to generate and issue to customers electronic receipts on behalf of the business entity.

In step 202 of FIG. 2 and Step 1 of FIG. 1A, receipt data is generated. This may be accomplished in a wide variety of ways that may vary depending upon a particular implementation. For example, a user of client device 110 may invoke a CFDI application on client device 110 that causes client device 110 to acquire an image of the one or more printed receipts using a camera on client device 110 and generate receipt data. In this example, the CFDI application may prompt a user to place the one or more printed receipts on a surface and then selection a button to acquire the image. As another example, the user may invoke a CFDI function on MFP 120 to cause MFP 120 to scan the one or more printed receipts and generate receipt data. In this example, the user is prompted by MFP 120 to place the one or more printed receipts onto a scanning area of MFP 120. In both examples, a user may be given an opportunity to specify a document or file name for the electronic receipt. In addition, a user may be permitted to specify one or more processes that are to receive the receipt data processing results for example, one or more applications from applications 176. Receipt data may be in a wide variety of formats that may vary depending upon a particular implementation and embodiments are not limited to any particular data format. Example formats include, without limitation, image formats such as JPG, TIF, PNG, GIF and RAW. After the one or more printed receipts have been scanned and the scan data generated, the user may perform one or more functions on the scan data using functionality provided by client device 110 or MFP 120. For example, a user may change the orientation of the image and apply scaling or other special effects, such as changing the contrast, etc.

In step 204 of FIG. 2 and Step 2 of FIG. 1A, a receipt data processing request is generated and transmitted to receipt data management system 130. The receipt data processing request may be generated by client device 110 or MFP 120 and transmitted to receipt data management system 130 using, for example, an API provided by receipt data management process. The receipt data processing request specifies receipt data to be processed and user identification data that identifies a user. As described in more detail hereinafter, receipt data management system 130 processes the receipt data to identify the business entity that issued each printed receipt represented in the receipt data and also determine that site 140 is the site that corresponds to the business entity. The receipt data processing request may also specify a document or file name for the receipt data processing results and/or one or more applications to process the receipt data processing results, if specified by the user. For example, a receipt data processing request may specify that the receipt data processing results are to be provided to one or more of the external systems 170 for storage and/or processing, instead of or in addition to, the user. The receipt data to be processed may be included with the receipt data processing request or may be referenced by the receipt data processing request via identification data or a link and provided separately. For example, the receipt data may be provided via a separate communication or the receipt data processing request may include a reference to the receipt data to enable the receipt data management system 130 to retrieve the receipt data. Receipt data processing results may be automatically provided to the user identified by the user identification data, for example, as a default. Receipt data processing requests may be in any format that may vary depending upon a particular implementation, and embodiments are not limited to receipt data processing requests being in a particular format.

In step 206 of FIG. 2 and Step 3 of FIG. 1A, receipt data management system 130 processes the receipt data processing request received from client device 110 or MFP 120. This may include performing several functions, such as OCR 132 to generate OCR results data that may include, for example, text data, indexing 134 to index the text, and edge detection 136 to identify separate receipts, if multiple receipts are included in the receipt data.

Figure 1B:
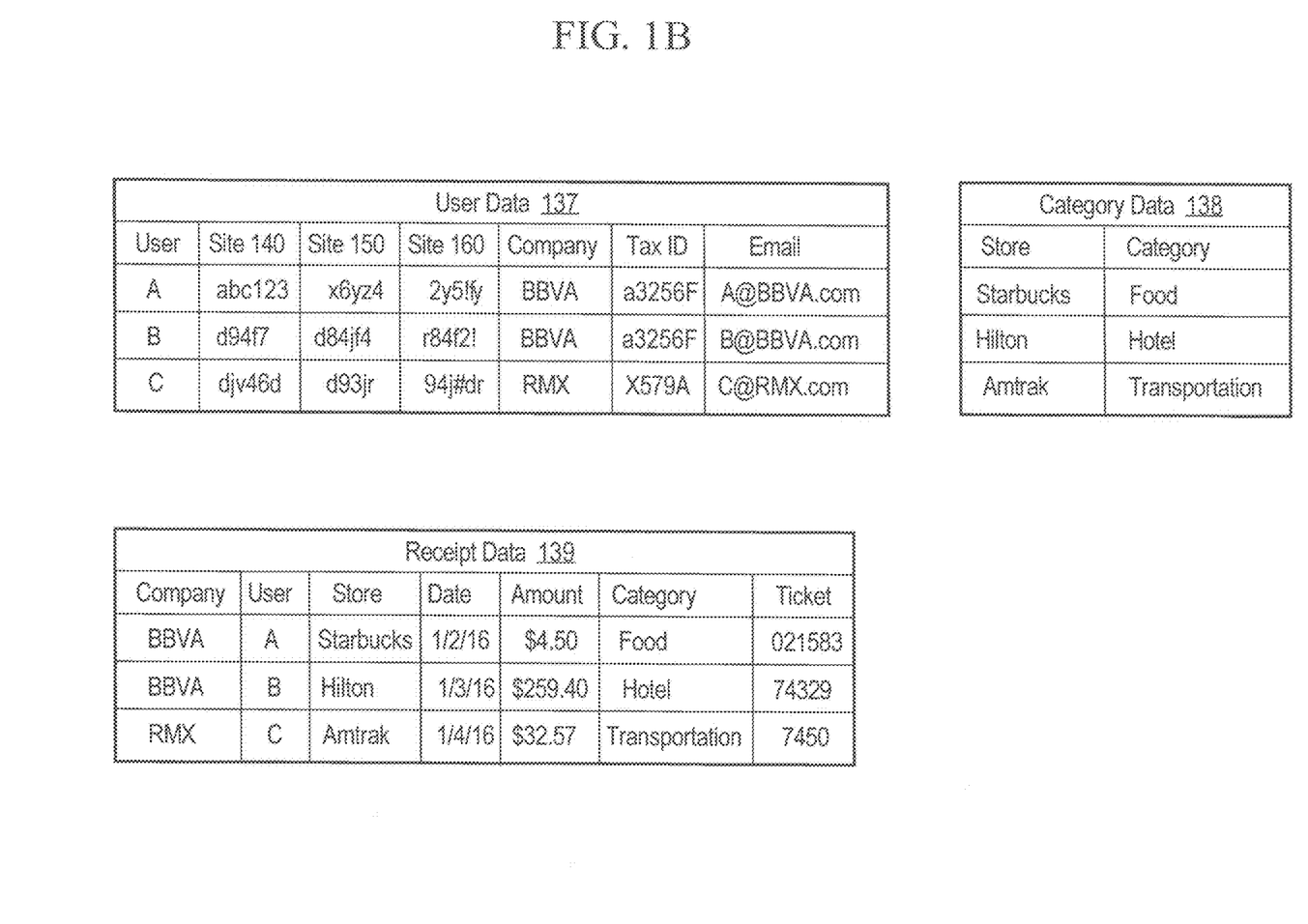
FIG. 1B depicts example user data, category data and receipt data maintained by a receipt data management system.

According to one embodiment, receipt data management system 130 analyzes the receipt data to identify, for each paper receipt represented in the receipt data, a business entity that issued the receipt and then identifies a site that corresponds to the business entity. This may include, for example, analyzing the OCR results data from OCR 132 to identify a name of the business entity. The name of the business entity may then be used to identify the corresponding site and site identification data that specifies the corresponding site. Receipt data management system 130 may maintain data that identifies a corresponding site for each of a plurality of business entities and indexing 134 may be used to identify a site that corresponds to a particular business entity. Receipt data management system 130 then uses the user identification data included in the receipt data processing request and the site identification data to identify authentication data that will be used to fulfill access requirements of the specified site that will be processing the receipt data. For example, receipt data management system 130 may use indexing 134 and user data 137 to identify particular authentication data for a particular combination of user and site. FIG. 1B depicts example user data 137, category data 138 and receipt data 139 maintained by receipt data management system 130. Each row of user data 137 corresponds to a user and includes user identification data, authentication data for sites 140, 150, 160, a company associated with the user, such as an employer of the user, tax identification data for the company and an email address for the user. The company associated with the user may be used for analysis purposes, for example, to analyze costs and trends. The email address may be used by receipt data management system 130 as a destination for receipt data processing results, including electronic receipts. The category data 138 specifies a business entity category for each of three stores and may be used to analyze expenses on a category-by-category basis. According to one embodiment, receipt data 139 is generated based upon the OCR results data for the receipt data processed by receipt data management system 130. Each row of receipt data 139 corresponds to a receipt issued by a business entity and includes a company name or identifier associated with a user, such as an employer of the user, user identification data, a business entity (store) where the transaction occurred, a date of the transaction, amount of the transaction, category of the business entity (store) and receipt or ticket identifier that uniquely identifies the receipt. User data 137, category data 138 and receipt data 139 each include three entries (rows) for purposes of explanation and may include any number of rows. In addition, user data 137, category data 138 and receipt data 139 may include additional data beyond that which is depicted in FIG. 1B, depending upon a particular implementation. User data 137, category data 138 and receipt data 139 are depicted in FIG. 1A as being maintained locally with respect to receipt data management system 130 for purposes of explanation only and this data may be maintained remotely from receipt data management system 130.

Continuing with the example depicted in FIG. 1B, user data 137 includes authentication data for three users, identified in FIG. 1B as User A, User B and User C, with respect to sites 140, 150, 160. The authentication data may represent, for example, a password that is required to access the corresponding site. The authentication data is used by receipt data management system 130 to access a corresponding site on behalf of a user associated with the receipt data processing request. The example of user data 137 depicted in FIG. 1B includes access data for three users with respect to three sites for purposes of explanation only, and user data 137 may include access data for any number of users and sites. In addition, the authentication data is depicted in FIG. 1B as being an alphanumeric string for purposes of explanation, but embodiments are not limited to this context and authentication data may be any type of data in any form. If the receipt data processing request specifies a document or file name for the receipt data processing results and/or one or more applications to process the receipt data processing results, then the receipt data management system 130 may store this information locally for use after the receipt data processing results are received from site 140.

In step 208 of FIG. 2 and Step 4 of FIG. 1A, receipt data management system 130 generates and transmits to site 140 one or more receipt data processing requests, where each receipt data processing request corresponds to a printed receipt represented in the receipt data received from client device 110 or MFP 120. Receipt data management system 130 is capable of processing receipt data that represents multiple receipts issued by different business entities. This improves the user experience by allowing a user to scan or acquire a phot of multiple paper receipts at once. This capability also improves the functioning of the arrangement 100 by reducing the number of requests that need to be made by client device 110 or MFP 120, the amount of computational resources consumed by client device 110 or MFP 120, and the amount of network traffic over communications links 180. This approach also reduces the amount of data transmitted by receipt data management system 130 to site 140 because the request transmitted by receipt data management system 130 may include data that identifies the printed receipt, such as a receipt or ticket number, instead of all of the electronic receipt data for the printed receipt. According to one embodiment, receipt data management system 130 generates and transmits to site 140, a receipt data processing request that specifies the receipt data to be processed, user identification data that identifies a user and the authentication data required by the site 140. In this respect, the original receipt data request generated and transmitted by client device 110 or MFP 120 may be considered to be a first receipt data request and the receipt data request generated and transmitted by the receipt data management system 130 may be considered to be a second receipt data request. The receipt data is data that at least identifies the paper receipt. Sites for business entities may maintain electronic receipt data for all paper receipts issued by the business entity and in this situation the receipt data only needs to identify the paper receipt, for example, via a receipt or ticket number. For example, a business entity may maintain a receipt database that stores data that indicates each receipt that the business entity has issued, for business entities that have multiple locations, the location where the receipt was issued, the date of the transaction, the amount of the transaction, the category of the transaction, customer identification data (if applicable), etc. For example, assuming that the user identification data identifies User A as the user and that site 140 is the site to process the receipt data, then the receipt data processing request generated and transmitted to site 140 by receipt data management system 130 includes receipt data that at least identifies the printed receipt, the user identification data that identifies User A as the user, the authentication data "abc123" and the receipt data to be processed. The receipt data may include more than data that identifies the corresponding paper receipt. For example, the receipt data may include additional results from the OCR results data generated by OCR 132. The receipt data processing request conforms to the API supported by site 140 and may include, for example, one or more commands supported by the API of site 140 for making receipt data processing requests. An example command is "Request_Receipt_Data (User A, "abc123", Receipt_Data), where the parameter "Receipt_Data" is a reference to the receipt data to be processed, or the actual receipt data to be processed. Note that there is no need for the receipt data processing request to include a document or file name for the receipt data processing results and/or one or more applications to process the receipt data processing results, if such information was specified in the receipt data processing request, since receipt data management system 130 will receive the receipt data processing results from site 140. The receipt data processing request generated by receipt data management system 130 may be a new request, relative to the receipt data processing request generated by client device 110 or MFP 120, or the receipt data processing request generated by receipt data management system 130 may be a modified or updated version of the receipt data processing request generated by client device 110 or MFP 120. According to one embodiment, if the result of receipt data management system 130 determines, for example via edge detection 136, that the receipt data specified in the receipt data processing request received from client device 110 or MFP 120 includes more than one receipt, then receipt data management process generates a separate receipt data processing request for each receipt. This will cause separate receipt data processing results to be generated by site 140 for each receipt. Receipt data management system 130 may transmit the receipt data processing request to site 140 using a wide variety of approaches. For example, receipt data management system 130 may transmit the receipt data processing request to an IP address and port number the corresponds to receipt data processing service 142 on site 140.

In step 210 of FIG. 2 and Step 5 of FIG. 1A, site 140 processes the one or more receipt data processing requests and generates receipt data processing results. This may include site 140, and more specifically receipt data processing service 142, authenticating the requests using the user identification data and the authentication data included in the receipt data processing request received from receipt data management system 130. Note that although embodiments are described herein and depicted in the figures as including user authentication, this is not required and embodiments are applicable to situations where user authentication is not required to access sites.

Figure 3A:
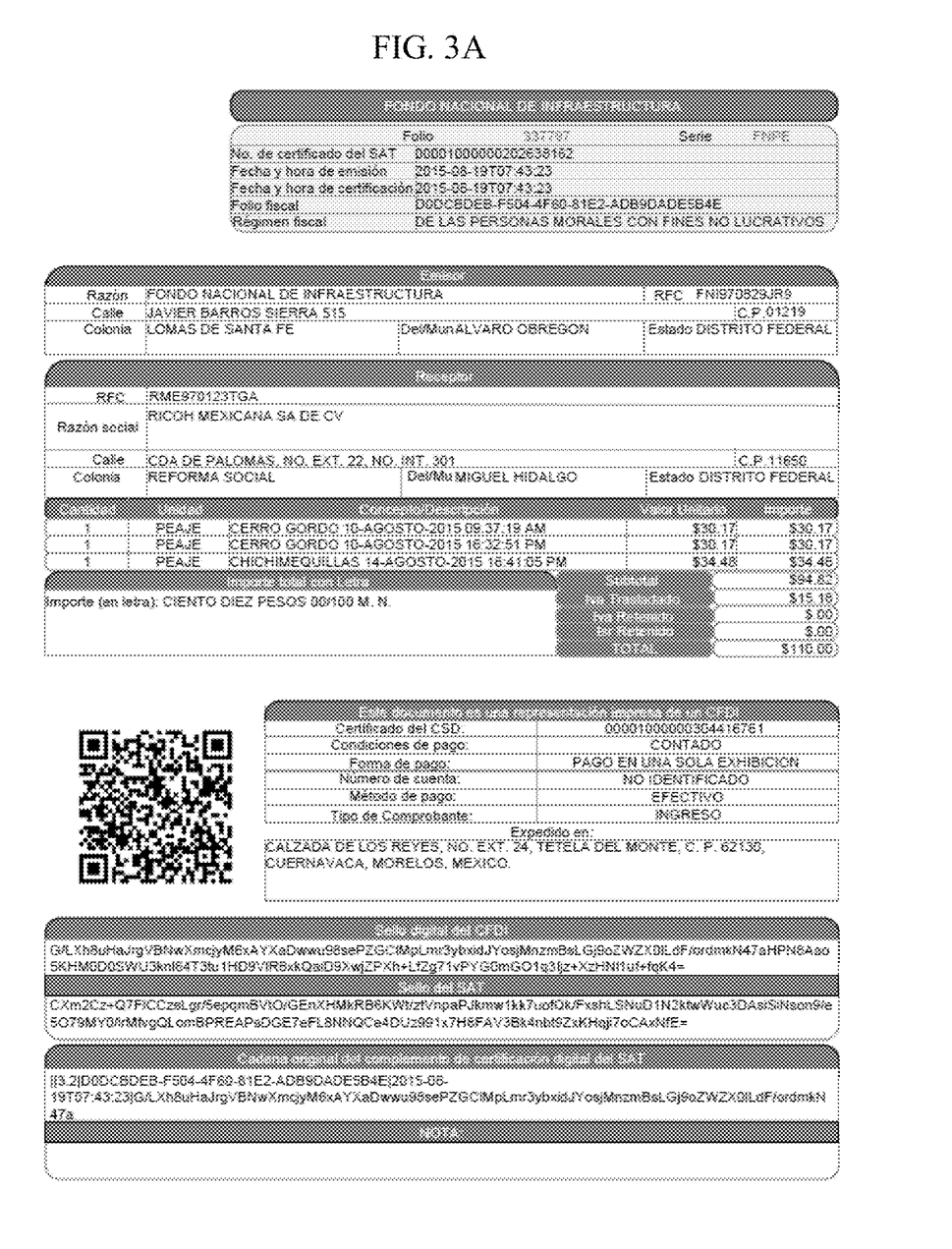
FIG. 3A depicts an electronic receipt in the form of a PDF document.

After the one or more requests have been authenticated, receipt data processing service 142 processes each request and generates receipt data processing results that satisfy third party compliance requirements. For example, in the context of CFDI, receipt data processing service 142 generates electronic receipt data in the form of a XML, data, but other forms of data may also be included, such as PDF data. Receipt data processing service 142 may also store a local copy of the receipt processing results for use by site 140. This may be useful, for example, for the business organization associated with site 140 to comply with government regulations, such as tax regulations. FIGS. 3A and 3B depict example receipt data processing results in the form of an electronic receipt. FIG. 3A depicts the electronic receipt in the form of a PDF document and FIG. 3B depicts the electronic receipt in the form of an XML document. In FIG. 3B, some of the XML instructions have been replaced with the notation " . . . " for purposes of brevity. There may be situations where the site is not able to identify receipt data that corresponds to the receipt data specified in the receipt data processing request received from receipt data management system 130. This may occur if OCR 132 was not able to identify a valid receipt or ticket number, for example, if the original paper receipt was damaged or the receipt or ticket number on the printed receipt was otherwise obscured.

In this situation, the site may include an error message in the receipt data processing results to notify receipt data management system 130 of the error.

In step 212 of FIG. 2 and Step 6 of FIG. 1A, the receipt data processing results are provided to receipt data management system 130. For example, receipt data processing service 142 may transmit the receipt data processing results to receipt data management system 130. In step 214 of FIG. 2, and Step 7 of FIG. 1A, receipt data management system 130 may perform various processing on the receipt data processing results. The data processing may include storing the receipt data processing results locally, for example, in receipt data 139, or remotely, for example, in external systems 170. The data processing may include transmitting the receipt data processing results to client device 110. Before doing so, receipt data management system 130 may ensure that the receipt data processing results are named in accordance with the original receipt data processing request, if applicable. In addition, if the original receipt data processing request specified one or more applications to process the receipt data processing results, then receipt data management system 130 may transmit the receipt data processing results to those applications, such as more of the external systems 170 for storage and/or processing. Thus, in this manner, receipt data management system 130 may arrange for the receipt data processing results to be provided to multiple recipients on behalf of the user of client device 110 or MFP 120. According to one embodiment, receipt data management system 130 compares data included in the receipt data processing results to receipt data 139 to determine the accuracy of receipt data 139. Assuming that receipt data management system 130 was able to correctly obtain the receipt or ticket data from the receipt data provided by the client device 110 or MFP 120, then the receipt data processing results will include accurate receipt data because the receipt data processing results are generated by the site that corresponds to the business entity that generated the original paper receipts. According to one embodiment, receipt data management system 130 includes the capability for client devices to request and retrieve receipt data stored by receipt data management system 130. In this embodiment, receipt data management system 130 serves as a repository for receipt data and allows users to later request and receive electronic receipt data for previously processed receipts. This may include an electronic receipt, or all of the receipt results data that comply with third party requirements.

In the foregoing examples, it is presumed, for purposes of explanation only, that sites 140, 150, 160 are configured to process receipt data in accordance with a particular third party requirement, such as CFDI. Embodiments are not limited to this example, however, and sites 140, 150, 160 may be configured to process receipt data in accordance with any number of third party requirements. According to one embodiment, the APIs of sites 140, 150, 160 support the use of a requirement identifier that identifies a particular third party requirement that receipt data processing results should conform to. This capability allows a user of client device 110 or MFP 120 to indicate, via an application on client device 110 or via the control panel or graphical user interface of MFP 120, to specify a particular third party requirement that the user would like to use for the receipt data processing results. The receipt data processing request generated by client device 110 or MFP 120 may include a requirement identifier that identifies the particular third party requirement selected by the user. Similarly, the receipt data processing request generated by receipt data management system 130 may include the requirement identifier to enable the site 140, 150, 160 to generate the receipt data processing in a manner to comply with the specified third party requirement.

According to one embodiment, electronic receipts are transmitted directly from sites to the email address of the user from user data 137, and the receipt data management system 130 store the history of requesting electronic receipt at least, which can be used for future expense analysis. In this embodiment, receipt data management system 130 includes, in the receipt data processing request sent to site 140, the email address of the user from user data 137. Site 140 transmits the electronic receipt data directly to the email address contained in the receipt data processing request received by site 140 from receipt data management system 130.

IV. Additional Processing of Electronic Receipt Data

According to one embodiment, additional processing may be performed on electronic receipt data generated by sites 140, 150, 160. Examples of additional processing include, without limitation, storing electronic receipt data on storage 172 which may be, for example, cloud storage, processing electronic receipt data on client devices 174 and processing electronic receipt data by applications 176. Examples of applications 176 include, without limitation, various financial applications, such as budget and price applications, and financial analysis applications. According to one embodiment, receipt data management system 130 is configured to both store receipt processing results and provide receipt processing results to external systems 170 upon request. External systems 170, such as applications 176, may request stored receipt processing results using the API provided by receipt data management system 130.

V. Implementation Examples

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
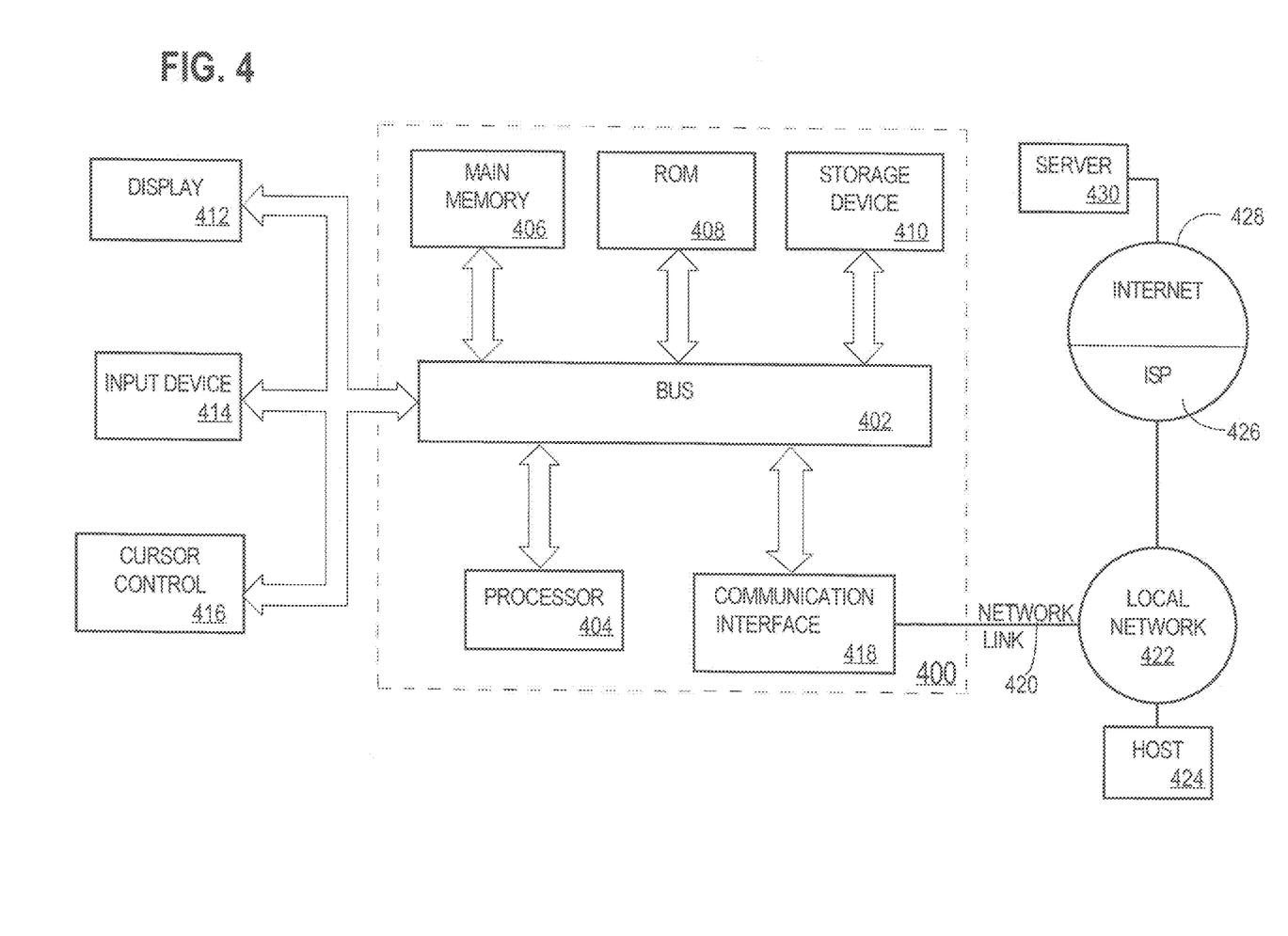
FIG. 4 is a block diagram that depicts an example computer system upon which embodiments may be implemented.

FIG. 4 is a block diagram that depicts an example computer system 400 upon which embodiments may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. Although bus 402 is illustrated as a single bus, bus 402 may comprise one or more buses. For example, bus 402 may include without limitation a control bus by which processor 404 controls other devices within computer system 400, an address bus by which processor 404 specifies memory locations of instructions for execution, or any other type of bus for transferring data or signals between components of computer system 400.

An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic or computer software which, in combination with the computer system, causes or programs computer system 400 to be a special-purpose machine. According to one embodiment, those techniques are performed by computer system 400 in response to processor 404 processing instructions stored in main memory 406. Such instructions may be read into main memory 406 from another non-transitory computer-readable medium, such as storage device 410. Processing of the instructions contained in main memory 406 by processor 404 causes performance of the functionality described herein. In alternative embodiments, hard-wired circuitry may be used in place of or in combination with software instructions to implement the embodiments. Thus, embodiments are not limited to any specific combination of hardware circuitry and software.

The term "non-transitory computer-readable medium" as used herein refers to any non-transitory medium that participates in providing data that causes a computer to operate in a specific manner. In an embodiment implemented using computer system 400, various computer-readable media are involved, for example, in providing instructions to processor 404 for execution. Such media may take many forms, including but not limited to, non-volatile and volatile non-transitory media. Non-volatile non-transitory media includes, for example, optical or magnetic disks, such as storage device 410. Volatile non-transitory media includes dynamic memory, such as main memory 406. Common forms of non-transitory computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of non-transitory computer-readable media may be involved in storing instructions for processing by processor 404. For example, the instructions may initially be stored on a storage medium of a remote computer and transmitted to computer system 400 via one or more communications links. Bus 402 carries the data to main memory 406, from which processor 404 retrieves and processes the instructions. The instructions received by main memory 406 may optionally be stored on storage device 410 either before or after processing by processor 404.

Computer system 400 also includes a communication interface 418 coupled to bus 402. Communication interface 418 provides a communications coupling to a network link 420 that is connected to a local network 422. For example, communication interface 418 may be a modem to provide a data communication connection to a telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be processed by processor 404 as it is received, and/or stored in storage device 410, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more processors;
   one or more memories storing instructions which, when processed by the one or more processors, cause the apparatus to:
   receive, from a client device, a first receipt data processing request to process receipt data, wherein the first receipt data processing request includes user identification data that identifies a user associated with the first receipt data processing request to process receipt data and receipt data, wherein the receipt data includes image data that represents two or more printed receipts,
   process the image data included in the receipt data using image processing that includes optical character recognition to generate optical character recognition results data,
   determine, based upon the optical character recognition results data, two or more printed receipts included in the image data of the receipt data,
   for each printed receipt from the two or more printed receipts included in the receipt data:
     determine, based upon the optical character recognition results data, a business entity that issued the printed receipt,
     determine a site that corresponds to the business entity that issued the printed receipt, wherein the site is one site of a plurality of sites for processing receipt data and each site of the plurality of sites includes both one or more access requirements and a user interface that allows users to enter receipt data and request generation of receipt data processing results that include at least an electronic receipt,
     determine from a plurality of site access data, based upon the user identification data that identifies the user associated with the first receipt data processing request to process receipt data and site identification data that specifies the site that corresponds to the business entity that issued the printed receipt, particular site access data that is specific to both the user identification data and the site identification data and that satisfies the one or more access requirements for the site,
     generate and transmit, to the site, a second receipt data processing request that:
       complies with the site and satisfies the one or more access requirements for the site,
       includes data that at least identifies the printed receipt, wherein the data that at least identifies the printed receipt is known by the site, includes the particular site access data, and
       includes destination data that identifies a destination where receipt data processing results are to be transmitted, wherein the receipt data processing results include at least electronic receipt data that corresponds to the one or more printed receipts and satisfy one or more third-party requirements for electronic receipts.

2. The apparatus of claim 1, wherein the one or more memories store additional instructions which, when processed by the one or more processors, cause the apparatus to:
   receive, from the site, the receipt data processing results that include at least the electronic receipt data that corresponds to the one or more printed receipts,
   compare the OCR results data to the receipt data processing results received from the site.

3. The apparatus of claim 1, wherein the one or more memories store additional instructions which, when processed by the one or more processors, cause the receipt data processing results to be one or more of transmitted to an application that executes remotely with respect to the receipt data management process or stored at a storage location that is remote to the receipt data management process.

4. The apparatus of claim 1, wherein each second receipt data processing request complies with an application programming interface of the site to which the second receipt processing request is transmitted.

5. The apparatus of claim 1, wherein the one or more third-party requirements for electronic receipts is Comprobante Fiscal Digital por Internet (CFDI) and the receipt data processing results include at least an electronic receipt in XML, format.

6. The apparatus of claim 1, wherein the receipt data processing results include data that uniquely identifies the site that corresponds to the business entity that issued the printed receipt.

7. The apparatus of claim 1, wherein each site of the plurality of sites implements a unique API and a unique graphical user interface that supports requests to process receipt data.

8. One or more non-transitory computer-readable media storing instructions which, when processed by one or more processors, causes:
a receipt data management system to:
  receive, from a client device, a first receipt data processing request to process receipt data, wherein the first receipt data processing request includes user identification data that identifies a user associated with the first receipt data processing request to process receipt data and receipt data, wherein the receipt data includes image data that represents two or more printed receipts,
  process the image data included in the receipt data using image processing that includes optical character recognition to generate optical character recognition results data,
  determine, based upon the optical character recognition results data, two or more printed receipts included in the image data of the receipt data,
  for each printed receipt from the two or more printed receipts included in the receipt data:
    determine, based upon the optical character recognition results data, a business entity that issued the printed receipt,
    determine a site that corresponds to the business entity that issued the printed receipt, wherein the site is one site of a plurality of sites for processing receipt data and each site of the plurality of sites includes both one or more access requirements and a user interface that allows users to enter receipt data and request generation of receipt data processing results that include at least an electronic receipt,
    determine from a plurality of site access data, based upon the user identification data that identifies the user associated with the first receipt data processing request to process receipt data and site identification data that specifies the site that corresponds to the business entity that issued the printed receipt, particular site access data that is specific to both the user identification data and the site identification data and that satisfies the one or more access requirements for the site,
    generate and transmit, to the site, a second receipt data processing request that:
      complies with the site and satisfies the one or more access requirements for the site,
      includes data that at least identifies the printed receipt, wherein the data that at least identifies the printed receipt is known by the site, includes the particular site access data, and includes destination data that identifies a destination where receipt data processing results are to be transmitted, wherein the receipt data processing results include at least electronic receipt data that corresponds to the one or more printed receipts and satisfy one or more third-party requirements for electronic receipts.

9. The one or more non-transitory computer-readable media of claim 8, further storing additional instructions which, when processed by the one or more processors, cause:
  receive, from the site, the receipt data processing results that include at least the electronic receipt data that corresponds to the one or more printed receipts,
  compare the OCR results data to the receipt data processing results received from the site.

10. The one or more non-transitory computer-readable media of claim 8, further storing additional instructions which, when processed by the one or more processors, cause the receipt data processing results to be one or more of transmitted to an application that executes remotely with respect to the receipt data management process or stored at a storage location that is remote to the receipt data management process.

11. The one or more non-transitory computer-readable media of claim 8, wherein each second receipt data processing request complies with an application programming interface of the site to which the second receipt processing request is transmitted.

12. The one or more non-transitory computer-readable media of claim 8, wherein the one or more third-party requirements for electronic receipts is Comprobante Fiscal Digital por Internet (CFDI) and the receipt data processing results include at least an electronic receipt in XML format.

13. The one or more non-transitory computer-readable media of claim 8, wherein the receipt data processing results include data that uniquely identifies the site that corresponds to the business entity that issued the printed receipt.

14. The one or more non-transitory computer-readable media of claim 8, wherein each site of the plurality of sites implements a unique API and a unique graphical user interface that supports requests to process receipt data.

15. A computer-implemented method comprising:
a receipt data management system:
  receiving, from a client device, a first receipt data processing request to process receipt data, wherein the first receipt data processing request includes user identification data that identifies a user associated with the first receipt data processing request to process receipt data and receipt data, wherein the receipt data includes image data that represents two or more printed receipts,
  processing the image data included in the receipt data using image processing that includes optical character recognition to generate optical character recognition results data,
  determining, based upon the optical character recognition results data, two or more printed receipts included in the receipt data,
  for each printed receipt from the two or more printed receipts included in the image data of the receipt data:
    determining, based upon the optical character recognition results data, a business entity that issued the printed receipt,
    determining a site that corresponds to the business entity that issued the printed receipt, wherein the site is one site of a plurality of sites for processing receipt data and each site of the plurality of sites includes both one or more access requirements and a user interface that allows users to enter receipt data and request generation of receipt data processing results that include at least an electronic receipt, determine from a plurality of site access data, based upon the user identification data that identifies the user associated with the first receipt data processing request to process receipt data and site identification data that specifies the site that corresponds to the business entity that issued the printed receipt, particular site access data that is specific to both the user identification data and the site identification data and that satisfies the one or more access requirements for the site, generating and transmitting, to the site, a second receipt data processing request that:
- complies with the site and satisfies the one or more access requirements for the site,
- includes data that at least identifies the printed receipt, wherein the data that at least identifies the printed receipt is known by the site, includes the particular site access data, and
- includes destination data that identifies a destination where receipt data processing results are to be transmitted, wherein the receipt data processing results include at least electronic receipt data that corresponds to the one or more printed receipts and satisfy one or more third-party requirements for electronic receipts.

16. The computer-implemented method of claim 15, further comprising:
receiving, from the site, the receipt data processing results that include at least the electronic receipt data that corresponds to the one or more printed receipts,
comparing the OCR results data to the receipt data processing results received from the site.

17. The computer-implemented method of claim 15, further comprising causing the receipt data processing results to be one or more of transmitted to an application that executes remotely with respect to the receipt data management process or stored at a storage location that is remote to the receipt data management process.

18. The computer-implemented method of claim 15, wherein each second receipt data processing request complies with an application programming interface of the site to which the second receipt processing request is transmitted.

19. The computer-implemented method of claim 15, wherein the one or more third-party requirements for electronic receipts is Comprobante Fiscal Digital por Internet (CFDI) and the receipt data processing results include at least an electronic receipt in XML format.

20. The computer-implemented method of claim 15, wherein the receipt data processing results include data that uniquely identifies the site that corresponds to the business entity that issued the printed receipt.

\* \* \* \* \*